United States Patent
Gold et al.

[11] Patent Number: 5,450,219
[45] Date of Patent: Sep. 12, 1995

[54] RASTER FOLLOWING TELECENTRIC ILLUMINATION SCANNING SYSTEM FOR ENHANCING LIGHT THROUGHOUT IN LIGHT VALVE PROJECTION SYSTEMS

[75] Inventors: Ronald S. Gold, Fullerton; Victor J. Fritz, Chino Hills, both of Calif.

[73] Assignee: Hughes Aircraft Company, Los Angeles, Calif.

[21] Appl. No.: 154,042

[22] Filed: Nov. 17, 1993

[51] Int. Cl.$^6$ ............................................. G03B 21/00
[52] U.S. Cl. ........................................ 359/40; 359/41; 359/17
[58] Field of Search ................... 359/36, 37, 40, 41, 359/216, 217, 219, 218, 17

[56] References Cited

U.S. PATENT DOCUMENTS

| | | | |
|---|---|---|---|
| 4,214,807 | 7/1980 | Gfeller et al. | 350/3.73 |
| 4,533,215 | 8/1985 | Trias et al. | 359/48 |
| 4,734,558 | 3/1988 | Nakano et al. | 359/41 |
| 5,026,145 | 6/1991 | Marui et al. | 359/663 |
| 5,260,815 | 11/1993 | Takizawa | 359/41 |

*Primary Examiner*—Vincent P. McGraw
*Assistant Examiner*—Robert Kim
*Attorney, Agent, or Firm*—Wanda K. Denson-Low; Georgann S. Grunebach

[57] ABSTRACT

Optical apparatus that condenses illuminating light into a narrow formatted band of light that follows activated lines down a light valve as it is driven. The present invention is a telecentric illumination scanning system that comprises an input lens group, a rotatable or oscillating reflective scanner, an output lens group and a polarizing element. The input lens group transmits light provided by a light source to the scanner, which is reflected therefrom and is directed to the output lens group. The light transmitted by the output lens group is polarized by the polarizing element and applied to the light valve. The input and output lens groups focus the light provided by the light source into a relatively narrow band of light that is scanned by the rotatable or oscillating scanner across the face of the light valve. A telecentric light zone is formed in a predetermined space between the output lens group and the light valve. Scanning is accomplished by varying the angle of the bundle of chief rays at the aperture stop. The scanned illumination may be synchronized with the imaging processes of the light valve. The present invention thus eliminates illumination from the areas of the light valve that are not activated during or between video frames. The present approach to concentrating and manipulating the illuminating light greatly increases the light output and contrast of a light valve type projector system. The present system increases the efficiency of a projector to 5 to 10 lumens per watt (5-10 times) with an increase in contrast of approximately 100%, thereby enhancing the projector performance. This permits a decrease in the input power to the projector and lowers the cost of the illumination subsystem, and in turn, the total projector cost.

14 Claims, 2 Drawing Sheets

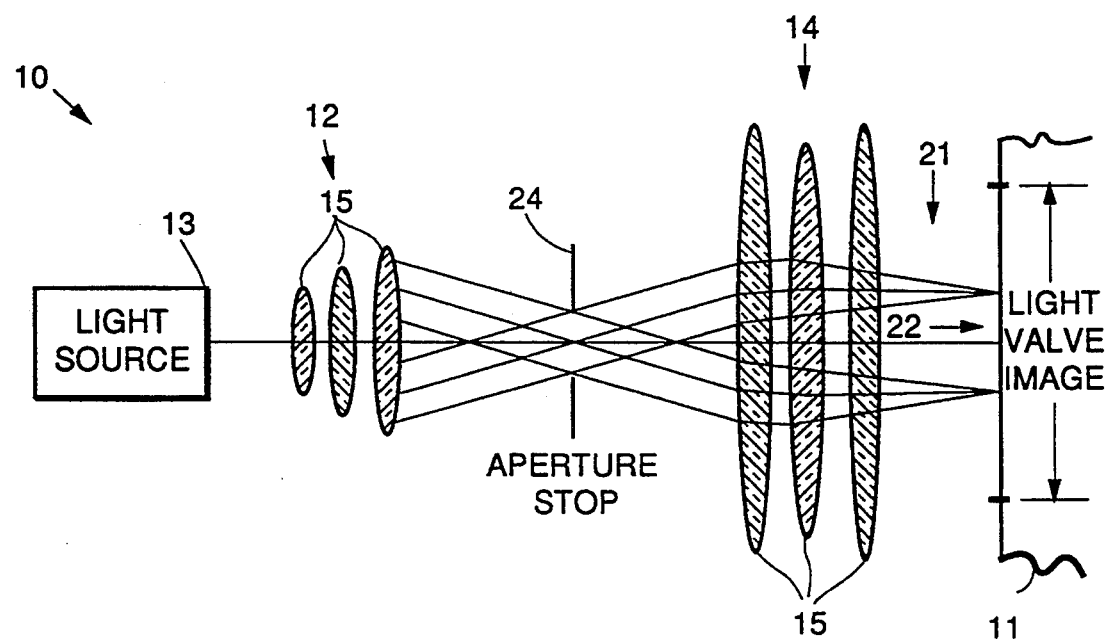
FIG.2.
FIG.3.
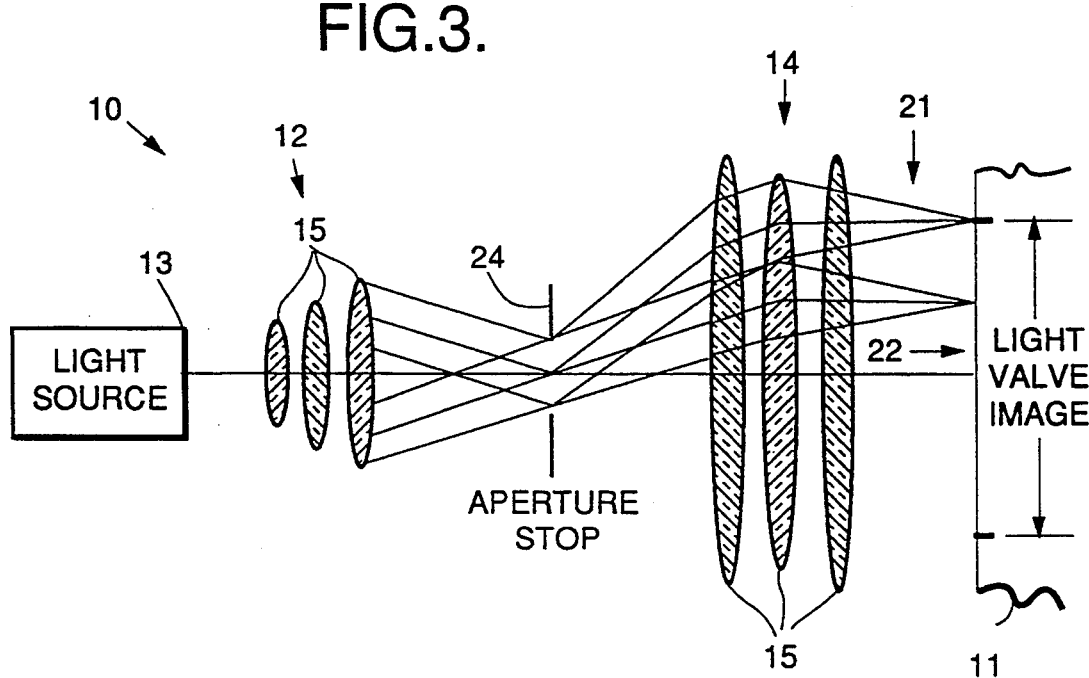

RASTER FOLLOWING TELECENTRIC ILLUMINATION SCANNING SYSTEM FOR ENHANCING LIGHT THROUGHOUT IN LIGHT VALVE PROJECTION SYSTEMS

BACKGROUND

The present invention generally relates to scanning systems, and more particularly to a telecentric illumination scanning system for illuminating a liquid crystal valve.

One current technique for illuminating liquid crystal light valve based projection systems, used by an affiliate and assignee of the present invention, is a continuous full frame, full aperture illumination system, wherein light is relayed or directed to a light valve in a telecentric or near-telecentric manner. The light valve is activated by writing a video frame one line at a time on the back of the light valve (for a reflective photoconductive light valve) or in pixel blocks (e.g. 64 at a time) for a matrix type transmissive or reflective light valve.

Prior art systems include refractive scanning systems in which several cylindrical lenses are placed around the periphery of a disk and thereby scan by bending the light path. Each lens covers a percentage of the light valve depending upon the number of lenses, or the shape of the refractive surface (i.e., one continuous lens as opposed to multiple lenslets). This approach is very sensitive to eccentricity of rotation. Another approach incorporates a refractive cube that rotates about an axis perpendicular to transparent cube faces. This approach uses a well-known principle of axis displacement due to a tilted parallel plate. In accordance with this principle $$\text{Displacement} = t\sin\theta \left[ 1 - \sqrt{\frac{1 - \sin^2\theta}{n^2 - \sin^2\theta}} \right]$$

where t is the thickness of the plate or cube, $\theta$ is the angle tilted, and n is the index of refraction of the plate or cube. Both approaches are sensitive to chromatic effects, and other aberrations. With the cube approach the aberrations of all rays (that is, the cone rays), other than chief rays, vary as the angle varies in rotation.

Accordingly, it is an objective of the present invention to provide for a telecentric illumination scanning system for illuminating liquid crystal light valves that overcomes the limitations of the prior art scanning systems.

SUMMARY OF THE INVENTION

The present invention is a telecentric illumination scanning system that comprises an input lens group that is adapted to transmit light provided by a light source to a rotatable scanner or angular oscillation device. Light transmitted by the input lens group is reflected from the rotatable scanner or angular oscillation device and is directed to an output lens group. The scanner may comprise a rotatable polygon or mirror galvanometer, or a reflective hologram, for example. The light reflected from the rotatable reflector is focused by the output lens group through a polarizing optical element, such as a polarizing beamsplitting prism, for example, onto a light valve, Alteratively, the light transmitted by the output lens group may be reflected by an optional folding mirror through a polarizing beamsplitting prism and onto a light valve. The input and output lens groups are adapted to focus the light provided by the light source into a relatively narrow band of light that is scanned by the rotatable reflector or mirror galvanometer across the face of the light valve. A telecentric light zone is formed in the predetermined space between the output lens group and the light valve. The primary function of the input lens group of the telecentric illumination scanning system is to direct and format the light at an aperture stop of the system.

The present telecentric illumination scanning system condenses illuminating light into a narrow formatted band of light that is adapted to follow the activated lines down the light valve as it is driven (activated). Since the present invention uses a reflective scanner, potential degrading chromatic effects and other aberrations are not introduced as a result of the scanning mechanism itself, as occurs in the prior art.

The present invention is designed to concentrate illumination energy from the light source, such as a xenon arc lamp, for example, into a narrow light band that is scanned across a light valve, or any other device that requires a separate illumination source. The reflective (mirror) scanner is disposed at the physical aperture stop of the system. Scanning is accomplished by varying the angle of the bundle of chief rays through the aperture stop. The scanned illumination may be synchronized with the imaging processes of the light valve, such as CRT raster scan, matrix addressed lines or portions of lines, and the like. The present invention thus eliminates illumination from the areas of the light valve that are not activated during or between video frames. The present approach to concentrating and manipulating the illuminating light greatly increases the light output and contrast of a light valve type projector system.

The telecentric illumination scanning system is particularly well adapted for use in liquid crystal light valve projection displays. A typical large screen display light valve projector output is approximately 1 lumen of light for every 1 watt of input power. This scanning system of the present invention is adapted to increase the efficiency of the projector to 5 to 10 lumens per watt with an increase in contrast of approximately 100%, thereby enhancing the projector performance. This permit a decrease in the input power to the projector and lowers the cost of the illumination subsystem, and in turn, the total projector cost the telecentric scanning system may also be utilized with metrology type measurement devices or any device requiring telecentric illumination, especially when a photo recording or hard copy, for example, of the information is necessary.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates optical paths of light made incident on the light valve of FIG. 1 when employing the rotatable scanner or mirror galvanometer of the present invention at one location; and FIG. 3 illustrates optical paths of light made incident on the light valve of FIG. 1 using the rotatable scanner or mirror galvanometer of the present invention at a secondary position or location.

DETAILED DESCRIPTION

Figure 1:
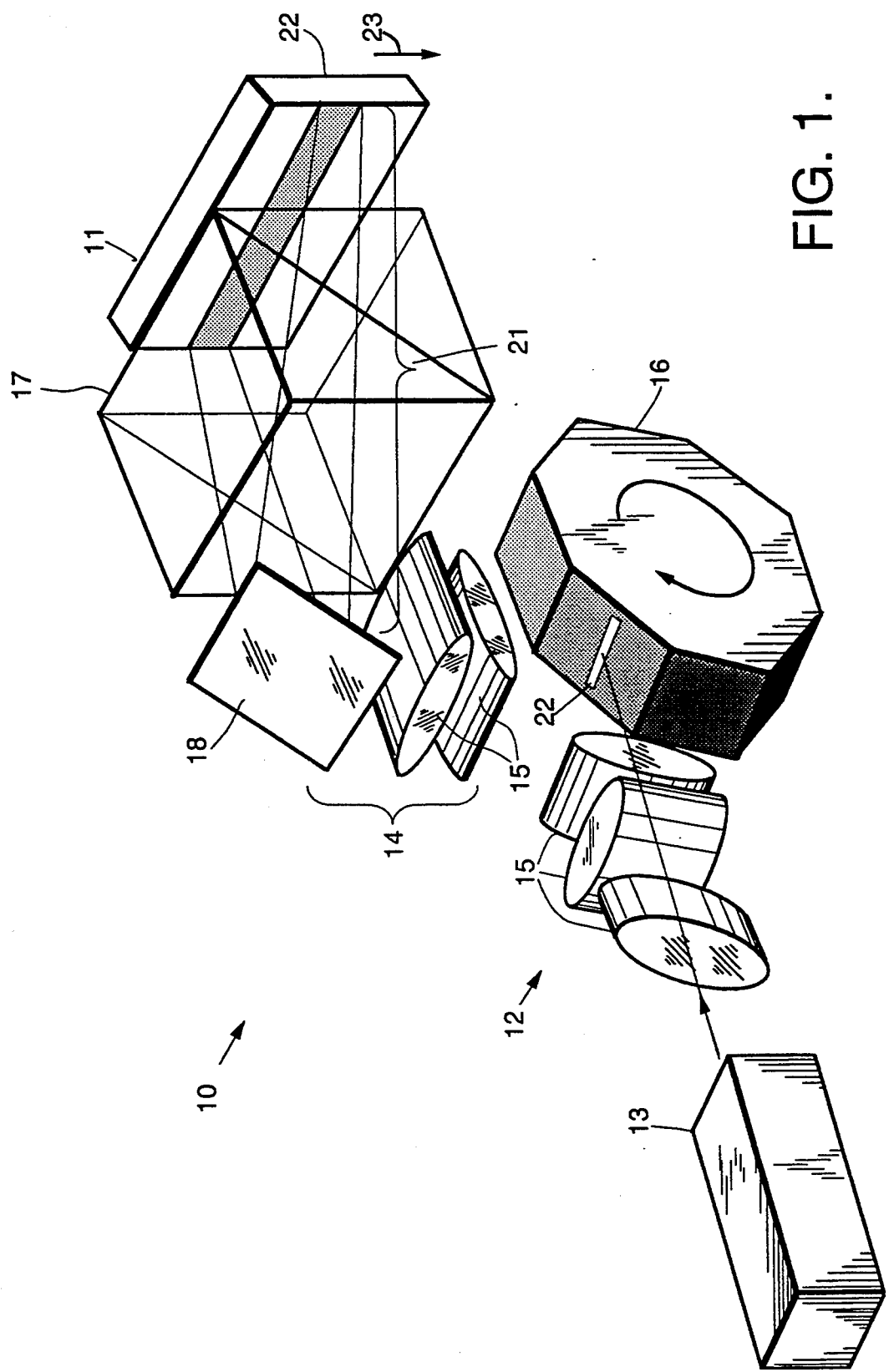
FIG. 1 illustrates an embodiment of a telecentric illumination scanning system in accordance with the principles of the present invention for illuminating a liquid crystal light valve based projection system.

In describing the present invention, an aperture stop is defined as an element of an imaging system that physically limits the angular size of a cone of light accepted by the system. A chief ray is any ray emanating from an off-axis point that passes through the center of the aperture stop. A telecentric system is one wherein all chief rays are parallel to the optical axis of the system.

Referring to the drawing figures, FIG. 1 illustrates an embodiment of a telecentric illumination scanning system 10 in accordance with the principles of the present invention for illuminating a light valve 11, such as a liquid crystal light valve, for example, that may be used in a light-valve-based projection system. The telecentric illumination scanning system 10 is comprised of an input lens group 12, comprising a plurality of spherical and anamorphic lenses 15, and is adapted to transmit light provided by a light source 13. The light source 13 may be a xenon arc lamp, for example. The plurality of spherical and anamorphic lenses 15 of the input lens group 12 are designed to format the light to transmit it to a rotatable or oscillating optical element 16, such as a scanner 16, for example. Consequently, light transmitted by the input lens group 12 is adapted to be reflected from the rotatable scanner 16 or oscillating scanner, and directed to an output lens group 14. The rotatable scanner 16 may comprise a rotatable polygon or oscillating mirror galvanometer, or a reflective hologram, for example. The light reflected from the rotatable scanner 16 is focused by the output lens group 14 onto a light valve 11. The output lens group 14 is also comprised of a plurality of spherical and anamorphic lenses 15. The light transmitted by the output lens group 14 may be reflected by an optional folding mirror through a polarizing beamsplitting prism 17 and onto the light valve 11.

The input and output lens groups 12, 14 are adapted to focus the light provided by the light source 13 into a relatively narrow band of light that is scanned by the rotatable scanner 16 across the face of the light valve 11. There is a telecentric light zone 21 in the predetermined space containing the polarizing beamsplitting prism 17. The light from the light source 13 may be collected by an external component such as an ellipsoidal mirror (not shown), for example, and directed to the input lens group 12 of the telecentric illumination scanning system 10. The primary function of the input lens group 12 of the telecentric illumination scanning system 10 is to direct and format the light at the aperture stop 24 (shown in FIGS. 2 and 3) of the telecentric illumination scanning system 10.

The light is formatted into a rectangular or pseudorectangular pattern 22 on a reflective surface of the rotatable scanner 16. The aperture stop 24 is positioned at the approximate center of the optics of the telecentric illumination scanning system 10, or in the alternative, as an external aperture stop 24 at the focus of the output lens group 14 of the telecentric illumination scanning system 10. The output lens group 14 then accepts the reflected illumination from the rotatable scanner 16, which is then magnified and relayed by the output lens group 14 comprising the spherical and anamorphic lens elements 15. The light is transmitted through the polarizing beamsplitting prism 17, or other polarizing device, to the light valve 11. Since the input image or light is made to cover a smaller field angle than is required to illuminate the entire light valve 11, the rotation of the rotatable scanner 16 varies the angle of the bundle of chief rays, thus moving the narrow light band of light illumination along the face of the light valve 11, indicated by the directional arrow 23.

FIG. 2 illustrates optical paths of light made incident on the light valve 11 of FIG. 1 for one position of the rotatable scanner 16 of the present invention. As is illustrated in FIG. 2, in this position, the light rays are focused in a band symmetric about the optical axis of the system 10 and areas of the light valve 11 are illuminated when they are activated. FIG. 3 illustrates optical paths of light made incident on the light valve 11 of FIG. 1 using the rotatable scanner 16 at a second position. As is illustrated in FIG. 3, with the rotatable scanner 16 at this second position, the light rays are focused in a band located at the top edge of the light valve 11 and are scanned to the bottom edge of the light valve 11 during rotation of the scanner 16, and areas of the light valve 11 are illuminated only when they are activated.

The present invention is designed to concentrate illuminating light from the light source 13 into the narrow light band 22 of light that is scanned across the light valve 11 or other device that requires a separate illumination source 13. The rotatable reflective (mirror) scanner 16 is typically disposed at the physical aperture stop 24 of the system 10. Scanning is accomplished by varying the angle of the bundle of chief rays projected through the aperture stop 24. The scanned band 24 of light may be synchronized with the imaging processes of the light valve 11, such as CRT raster scan, matrix addressed lines or portions of lines, and the like. The present invention thus eliminates illumination from the areas of the light valve 11 that are not activated during or between video frames.

The telecentric illumination scanning system 10 is particularly well adapted for use in liquid crystal light valve projector systems. The present approach to concentrating and manipulating the illuminating light greatly increases the light output and contrast of a light valve type projector system. The output of a typical large screen display light valve projector is approximately 1 lumen of light for every 1 watt of input power. The system 10 of the present invention is adapted to increase the efficiency of the projector to 5 to 10 lumens per watt (5-10 times) with an increase in contrast of approximately 100%, thereby enhancing the performance of the projector system. This permits a decrease in the input power to the projector system and lowers the cost of the projector system.

Thus, there has been described a new and improved telecentric illumination scanning system for illuminating a light valve and projector systems incorporating them. It is to be understood that the above-described embodiment is merely illustrative of some of the many specific embodiments which represent applications of the principles of the present invention. Clearly, numerous and other arrangements can be readily devised by those skilled in the art without departing from the scope of the invention

What is claimed is:

1. A raster following telecentric illumination scanning system for enhancing light throughput in a light valve projection system comprising a light valve and activation means for activating the light valve, said scanning system comprising:

an input lens group for transmitting light provided by a light source;

a scanner optically coupled to the input lens group for receiving the light transmitted thereby and reflecting the light therefrom;

an output lens group optically coupled to the scanner for focusing light reflected by the scanner onto the light valve; and a polarizing optical element disposed between the output lens group and the light valve for polarizing the light focussed on the light valve;

wherein a telecentric light zone is formed in a predetermined space between the output lens group and the light valve, and wherein the input and output lens groups focus the light provided by the light source into a relatively narrow band of light that is scanned by the scanner across the light valve, and wherein the motion of the telecentric light zone and band of light is synchronized with the activation of the light valve by the activation means.

2. The system of claim 1 wherein the scanner comprises a rotatable scanner.

3. The system of claim 1 wherein the scanner comprises an oscillating scanner.

4. The system of claim 2 wherein the rotatable scanner comprises a rotatable polygon.

5. The system of claim 3 wherein the scanner comprises an oscillating mirror galvanometer.

6. The system of claim 2 wherein the rotatable scanner comprises a rotatable reflective hologram.

7. The system of claim 1 wherein the polarizing optical element comprises a polarizing beamsplitting prism.

8. The system of claim 1 further comprising a folding mirror disposed between the output lens group and the polarizing optical element.

9. The system of claim 8 wherein the scanner comprises a rotatable scanner.

10. The system of claim 8 wherein the scanner comprises an oscillating scanner.

11. The system of claim 9 wherein the rotatable scanner comprises a rotatable polygon.

12. The system of claim 8 wherein the scanner comprises a oscillating mirror galvanometer.

13. The system of claim 8 wherein the scanner comprises a rotatable reflective hologram.

14. The system of claim 8 wherein the polarizing optical element comprises a polarizing beamsplitting prism.

* * * * *